United States Patent
Fontana et al.

(10) Patent No.: US 12,252,583 B2
(45) Date of Patent: Mar. 18, 2025

(54) METHOD OF MAKING MIXTURE OF POLYMERS

(71) Applicant: SOLVAY SPECIALTY POLYMERS ITALY S.P.A., Bollate (IT)

(72) Inventors: Giovanni Fontana, Paderno Dugnano (IT); Marco Galimberti, Bollate (IT); Vito Tortelli, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 494 days.

(21) Appl. No.: 17/251,527

(22) PCT Filed: Jun. 19, 2019

(86) PCT No.: PCT/EP2019/066156
§ 371 (c)(1),
(2) Date: Dec. 11, 2020

(87) PCT Pub. No.: WO2019/243404
PCT Pub. Date: Dec. 26, 2019

(65) Prior Publication Data
US 2021/0246264 A1    Aug. 12, 2021

(30) Foreign Application Priority Data

Jun. 20, 2018 (EP) .................................. 18178902

(51) Int. Cl.
C08G 65/00 (2006.01)
C08G 65/332 (2006.01)

(52) U.S. Cl.
CPC ....... *C08G 65/007* (2013.01); *C08G 65/3322* (2013.01); *C08G 2650/48* (2013.01)

(58) Field of Classification Search
None
See application file for complete search history.

(56) References Cited

U.S. PATENT DOCUMENTS

| | | |
|---|---|---|
| 3,810,874 A | 5/1974 | Mitsch et al. |
| 2004/0192974 A1 | 9/2004 | Navarrini et al. |
| 2011/0136713 A1* | 6/2011 | Marchionni ......... C10M 147/04 568/669 |
| 2012/0251843 A1 | 10/2012 | Yan et al. |

FOREIGN PATENT DOCUMENTS

| | | |
|---|---|---|
| EP | 2100909 A1 | 9/2009 |
| WO | 2010057691 A2 | 5/2010 |
| WO | 2013092632 A1 | 6/2013 |
| WO | WO-2016083279 A1 * | 6/2016 ........... C08G 65/007 |
| WO | 2019243403 A1 | 12/2019 |

OTHER PUBLICATIONS

Sir Allen G. et al., "Structure-Property Relationships in Perfluoropolyethers: A Family of Polymeric Oils", Comprehensive Polymer Science, Second Supplement, 1996, Chapter 9, pp. 347-388.

Avataneo M. et al., Synthesis of alfa-omega-dimethoxyfluoropolyethers: reaction mechanism and kinetics, Journal of Fluorine Chemistry, 2005, vol. 126, p. 633-639.

Galimbert M et al., New catalytic alkylation of in situ generated perfluoro-alkyloxy-anions and perfluoro-carbanions, Journal of Fluorine Chemistry, 2005, vol. 126, p. 1578-1586.

* cited by examiner

*Primary Examiner* — Rachel Kahn
(74) *Attorney, Agent, or Firm* — Osha Bergman Watanabe & Burton LLP

(57) ABSTRACT

The present invention relates to a process for the synthesis of partially and fully fluorinated polyether (PFPE) polymers comprising cyclic moieties in the backbone chain, to PFPE polymers obtained therefrom and to the use of said PFPE polymers as intermediate compounds for the manufacture of additives for plastic and glass coating.

7 Claims, No Drawings

METHOD OF MAKING MIXTURE OF POLYMERS

CROSS-REFERENCE TO RELATED APPLICATIONS

This application is a U.S. national stage entry under 35 U.S.C. § 371 of International Application No. PCT/EP2019/066156 filed Jun. 19, 2019, which claims priority from European Patent Application No. 18178902.5, filed on Jun. 20, 2018. The entire contents of these applications are explicitly incorporated herein by this reference.

TECHNICAL FIELD

The present invention relates to a process for the synthesis of partially (HFPE) and fully fluorinated polyether (PFPE) polymers containing cyclic structures in their main backbone, to HFPE and PFPE polymers obtained therefrom and to the use of said HFPE or PFPE polymers as intermediate compounds for the manufacture of additives for plastic and glass coating.

BACKGROUND ART

Among fluorinated polymers, (per)fluoropolyether polymers (PFPEs) are well-known and of great interest for their chemical and physical properties, which make them particularly interesting notably as lubricants.

Several syntheses of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature. (ALLEN, Geoffrey, et al. COMPREHENSIVE POLYMER SCIENCE—Second supplement. Edited by SIR ALLEN, Geoffrey, et al. Elsevier Science, 1996. ISBN 0080427081. p. 347-388.).

For example, the catalytic polymerization of perfluoroepoxides, such as notably hexafluoropropylene oxide (HFPO), firstly disclosed by Du Pont researchers, led to a product commercially available under the trade name Krytox®, which backbone comprises recurring units of formula —[CF(CF$_3$)CF$_2$O]$_y$—. Then, Montedison researchers disclosed the photochemical oxidation of perfluoro-olefins, such as tetrafluoroethylene and hexafluoropropene, which led to a product commercially available under the trade name Fomblin®, which backbone comprises randomly distributed recurring units of formula —[(CF$_2$O)$_m$(CF$_2$CF(R)O)$_n$]— wherein R is —F or —CF$_3$. Another synthesis, which involved the ring opening polymerization of partially fluorinated oxetanes followed by fluorination, was disclosed by Daikin Company and led to a product commercially available under the trade name Demnum®, which backbone comprises recurring units of formula —(CF$_2$CF$_2$CF$_2$O)$_p$—.

The main difference between the (per)fluoropolyether polymers known in the art resides in the fact that Krytox® polymers and Demnum® polymers are homopolymers characterized by an ordered structure, which comprises only one type of recurring unit, i.e. —[CF(CF$_3$)CF$_2$O]$_y$— and —(CF$_2$CF$_2$CF$_2$O)$_p$—, respectively. Differently, Fomblin® polymers are copolymers characterized by the presence of two or more recurring units having a different formula and being randomly distributed (also defined as statistically distributed) along the backbone chain. This random distribution of the recurring units is due to the manufacturing process based on photochemical oxidation of perfluoroolefins. However, the random distribution of the recurring units could led to a backbone chain comprising multiple consecutive recurring units having one carbon atoms (i.e., of formula —CF$_2$O—), which on the one hand increase the flexibility of the polymer backbone but on the other hand constitute a weak point in the polymer backbone, as they are more easily attacked by metals and/or Lewis acids.

Partially fluorinated compounds and methods for their preparation have been disclosed in the art.

For example in US 20040192974 (SOLVAY SOLEXIS S.P.A.), which discloses a process for obtaining hydrofluoroether compounds comprising a (per)fluoroxyalkylene chain containing recurring units that are statistically distributed along the chain.

Also, WO 2010/057691 (SOLVAY SOLEXIS S.P.A.) discloses the synthesis of hydrofluoroalcohols of formula (I):

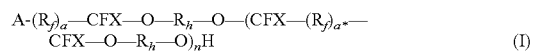

$$A-(R_f)_a-CFX-O-R_h-O-(CFX-(R_f)_{a^*}-CFX-O-R_h-O)_nH \quad (I)$$

wherein R$_h$ is a divalent C1-C20 hydrocarbon-based residue,

X is F or a C1-C6-(per)fluoroalkyl,

R$_f$ is a (per)fluoro(poly)oxyalkylene (PFPE) chain or a (per)fluoroalkyl chain. According to the preferred embodiment, R$_f$ is a PFPE chain comprising one or more recurring units of formula —(C$_3$F$_6$O)—, —(CF$_2$O)—, —(CF$_2$CF$_2$O)—, —(CF$_2$CF$_2$CF$_2$O)—, —(CF$_2$CF$_2$CF$_2$CF$_2$O)—, —[CF(CF$_3$)O]—, which are statistically (i.e. randomly) distributed along the chain.

None of the above mentioned documents however discloses or suggests either partial or complete fluorination (perfluorination) reaction of the hydrofluoro compounds obtained therein.

The synthesis of alfa-omega-dimethoxyfluoropolyethers was disclosed in AVATANEO, Marco, et al. Synthesis of alfa-omega-dimethoxyfluoropolyethers: reaction mechanism and kinetics. *Journal of Fluorine Chemistry*. 2005, vol. 126, p. 633-639, and in GALIMBERTI, Marco, et al. New catalytic alkylation of in situ generated perfluoro-alkyloxyanions and perfluoro-carbanions. *Journal of Fluorine Chemistry*. 2005, vol. 126, p. 1578-1586. However, the synthesis disclosed in these articles started from alkyl fluoroformate and perfluoropolyether diacyl fluoride, the latter being obtained by photopolymerization. In other words, the perfluoropolyether comprises at one chain end the group of formula —C(O)F, but it also comprises recurring units of formula —(CF$_2$CF$_2$O)— and —(CF$_2$O)— that are randomly distributed within the backbone of the polymer.

Nevertheless, no method has been made available which would enable synthesising with high yields and convenient manner partially (HFPE) and fully fluorinated polyether (PFPE) polymers containing cyclic structures in their main backbone.

Actually, the presence of a plurality of cyclic structures in the backbone of partially (HFPE) and fully fluorinated polyether (PFPE) polymers is an interesting structural feature for modifying chain mobility and for conferring to the resulting materials increased configurational stiffness, which would be particularly beneficial for improving certain advantageous properties, including notably their ability to perform as lubricants under severe conditions.

SUMMARY OF INVENTION

The Applicant faced the problem of preparing (per)fluoropolyether polymers mixtures comprising a plurality of cyclic structures in the backbone, i.e. (per)fluoropolyether polymers characterized by recurring units which have an a priori defined distribution, with alternated cyclic moieties, and wherein the fraction of reactive groups which could be further functionalized or conferring peculiar reactivity, also known as functional groups, may be also opportunely tuned.

Similarly, there's an unfilled need in the art for (per) fluoropolyether polymers mixtures with well-defined sequences of recurring units including cyclic structures, advantageously able to deliver outstanding mechanical properties.

Surprisingly, the Applicant found a process, which can be conveniently applied on industrial scale, for the synthesis of mixtures of compounds, having regularly alternated recurring units comprising cyclic moieties.

Thus, in a first aspect, the present invention relates to a method [method ($P_{FH}$)] for the synthesis of a mixture of polymers [polymer mixture ($FH_{cyclic}$)] said polymers comprising a partially fluorinated polyether backbone possessing a plurality of recurring units including at least one cyclic group; said process comprising:

Step (I): a step of contacting:
  at least one fluorinated compound [compound (F)] comprising at least two acyl-fluoride groups; and
  at least one hydrogenated compound [compound (H)] comprising at least two fluoroformate groups of formula —$CR_H^1R_H^2$—O—C(O)F, wherein each of $R_H^1$ and $R_H^2$, equal to or different from each other at each occurrence, is independently H or a $C_1$-$C_6$ hydrocarbon group,
in the presence of at least one fluoride-containing compound,
wherein:
(i) at least one compound (F) is a compound ($F^C$) of formula:

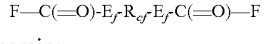

wherein:
  each of $E_f$, equal to or different from each other, is a bond, or a divalent fluorocarbon group, possibly comprising one or more than one heteroatoms selected from Cl, N, O and S;
  $R_{cf}$ is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S; and/or
(ii) at least one compound (H) is a compound ($H^C$) of formula:

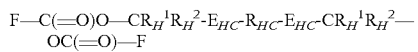

wherein:
  each of $E_{HC}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
  $R_{HC}$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
  each of $R_H^1$ and $R_H^2$ have the meaning defined above;
to provide said polymer mixture ($FH_{cyclic}$).

Advantageously, the process according to the present invention allows to prepare polymers comprising a (per) fluoropolyether backbone comprising recurring units which are distributed within the backbone in a pre-determined and well defined way, which comprise cyclic moieties which may be alicyclic moieties, aromatic moieties, aliphatic heterocyclic moieties, heteroaromatic moieties, and the like.

The polymer mixture ($FH_{cyclic}$) which may be obtained after Step (I) of method ($P_{FH}$) according to the present invention is another object of the present invention.

Thus in a second aspect, the present invention pertains to a mixture of polymers [polymer mixture ($FH_{cyclic}$)] comprising a partially fluorinated polyether backbone having two chain ends, wherein said backbone comprises recurring unit(s) derived from said at
  least one compound (F) alternately arranged with recurring unit(s) derived from said at least one compound (H), said recurring units being selected from the group consisting of
  recurring units of formula ($FH^c_{unit}$):

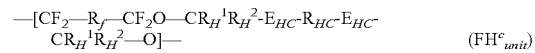

and recurring units of formula ($F^cH_{unit}$):

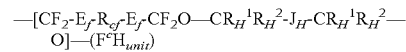

wherein
  $R_f$ is either a divalent, linear or branched, fluoro(hydro) carbon chain, wherein said fluoro(hydro)carbon chain comprises from 1 to 10 carbon atoms and is optionally interrupted by one or more oxygen atoms; or is a group of formula: -$E_f$-$R_{cf}$-$E_f$-;
  $E_{HC}$, $R_{HC}$, $R_H^1$ and $R_H^2$ have the same meanings defined above for compound ($H^C$); wherein:
  $E_f$ and $R_{cf}$ have same meaning defined above for compound ($F_C$);
  $J_H$ is either selected from a bond, a —O— group and a divalent linear or branched (oxy)alkylene group, wherein said (oxy)alkylene group comprises from 1 to 8 carbon atoms and is optionally interrupted by one or more than one ethereal oxygen atom; or is a group -$E_{HC}$-$R_{HC}$-$E_{HC}$-, wherein $E_{HC}$, $R_{HC}$, $R_H^1$ and $R_H^2$ have the same meanings defined above for compound ($H_C$).

Other aspects and objects of the invention will appear in the detailed description hereunder.

DESCRIPTION OF EMBODIMENTS

For the purpose of the present description and of the following claims:
  the use of parentheses around symbols or numbers identifying the formulae, for example in expressions like "polymer mixture ($FH_{cyclic}$)", etc., has the mere purpose of better distinguishing the symbol or number from the rest of the text and, hence, said parenthesis can also be omitted;
  the term "(per)fluoropolyether" is intended to indicate polyether polymer(s) comprising a fully fluorinated or partially fluorinated backbone;
  the term "perfluoropolyether" is intended to indicate polyether polymer(s) comprising a fully fluorinated backbone.

In Step (I) it may be possible to use a plurality of compounds (F) or a plurality of compounds (H), with the proviso that at least one of compounds (F) is a "cyclic" compound, i.e. is a compound (F$^c$) as above detailed, and/or that at least one of compounds (H) is a "cyclic" compound, i.e. a compound (H$^c$) as above detailed.

As said, in Step (I), at least compound (F) and at least one compound (H) are reacted; it may be possible to use a plurality of compounds (F) or a plurality of compounds (H), with the provisio that at least one of compounds (F) is a "cyclic" compound, i.e. is a compound (F$^c$) as above detailed, and/or that at least one of compounds (H) is a "cyclic" compound, i.e. a compound (H$^c$) as above detailed.

Mixtures of cyclic and non-cyclic compounds (F) and (H) may be used. Compounds (F) which are not cyclic, i.e. which are different from compounds (F$^c$) will be referred hereunder as compounds (F$^{l\&b}$). Similarly, compounds (H) which are not cyclic, i.e. which are different from compounds (H$^c$) will be referred hereunder as compounds (H$^{l\&b}$).

In other terms, methods wherein in Step (I):
at least a compound (F$^c$) and at least a compound (H) are reacted;
at least a compound (F$^c$) and compound(s) (H) different from compound (H$^c$) [i.e. a compound (H$^{l\&b}$)] are reacted; and
compound(s) (F) different from compound (F$^c$) [i.e. a compound (F$^{l\&b}$)] and at least a compound (H$^c$) are reacted;
are all embodiments according to the present invention.

Nevertheless, preferred embodiments of the invention are those wherein at least one compound (H) is a compound (H$^c$) as described above, and said compound (H$^c$) is reacted with compounds (F$^{l\&b}$), as described above, that is to say that the method includes reacting a cyclic hydrogenated fluoroformate with a fluorinated non-cyclic acyl fluoride derivative.

According to these embodiments, polymers of polymer mixture (FH$_{cyclic}$) have a backbone which preferably comprises (preferably consists essentially of) units (FH$^c_{unit}$), as detailed above, and more preferably of units (FH$^c_{unit}$), wherein R$_f$ is a divalent, perfluoro linear or branched (oxy) alkylene chain, wherein said alkylene chain comprises from 1 to 10 carbon atoms and is optionally interrupted by one or more oxygen atoms.

Preferably, said compound (F$^{l\&b}$) is a compound of formula:

F—C(=O)—R$_{fl}$—C(=O)—F wherein R$_{fl}$ is a divalent, linear or branched, fluoro(hydro)carbon chain, wherein said fluoro(hydro)carbon chain comprises from 1 to 10 carbon atoms and is optionally interrupted by one or more oxygen atoms and is preferably a divalent perfluoro linear or branched (oxy) alkylene chain, wherein said alkylene chain comprise from 1 to 10 carbon atoms and is optionally interrupted by one or more than one oxygen atom. More preferably, said perfluoro (oxy)alkylene group is a linear alkylene group, i.e. a group consisting of a sequence of —CF$_2$—, possibly including one or more than one ethereal oxygen —O—. Most preferably, said perfluoro (oxy)alkylene group comprises from 1 to 5 carbon atoms, even more preferably from 1 to 4 carbon atoms.

According to preferred embodiments, said compound (F$^{l\&b}$) is selected from the group comprising:
(F-i) FC(O)—CF$_2$—C(O)F;
(F-ii) FC(O)—CF$_2$—CF$_2$—C(O)F;
(F-iii) FC(O)—CF$_2$—CF$_2$—CF$_2$—C(O)F;
(F-iv) FC(O)—CF$_2$—CF$_2$—CF$_2$—CF$_2$—C(O)F;
(F-v) FC(O)—CF$_2$—O—CF$_2$—C(O)F.

Compounds (F$^c$) may be selected from alicyclic compounds and aromatic compounds. Among aromatic compounds (F$^C$) mention can be notably made of 2,3,5,6-tetrafluoroterephthalic acid difluoride, and 2,4,5,6-tetrafluoroterephthalic acid difluoride. Among aliphatic compounds (F$^C$) mention can be notably made of 1,2,2,3,3,4,5,5,6,6-decafluorocyclohexyldiacid difluoride, 1,2,2,3,4,4-hexafluorocyclobutyldiacid difluoride, 1,2,2,3,4,4,5,5-octafluorocyclopentyldiacid difluoride.

Nevertheless, as explained above, preferred embodiments of the invention are those wherein at least one compound (H) is a compound (H$^c$) as described above, and said compound (H$^c$) is reacted with compounds (F$^{l\&b}$), as described above.

As mentioned above, compound (H) is hydrogenated, that is to say that hydrogen atoms saturate all free valences on carbon atoms of the same, except as per the fluorine atom of the fluoroformate groups —CR$_H^1$R$_H^2$—O—C(O)F.

As said is preferred for compound (H) to include at least one compound (H$^c$): embodiments whereas all compounds (H) are compounds (H$^c$) are generally preferred, although it may be also acceptable to use as compound (H) a mixture of at least one compound (H$^c$) and a non-cyclic compound (H), which will be referred hereunder as compound (H$^{l\&b}$).

Compounds (H$_C$) may be selected from the group consisting of alicyclic compounds and aromatic compounds.

Among alicylic compounds (H$^c$), preferred are compounds of formula:

F—C(=O)O—CR$_H^1$R$_H^2$—R$_{aliHC}$—CR$_H^1$R$_H^2$—OC(=O)—F, wherein R$_H^1$ and R$_H^2$ have the meaning described above, and R$_{aliHC}$ is a divalent C$_5$-C$_{18}$ cycloaliphatic group, which is preferably selected from:
divalent cyclobutylene groups;
divalent cyclopentylene groups;
divalent cyclohexylene groups;
divalent norbornylene groups;
divalent bicyclo[4.4.0]decyl groups;
divalent spiro[5,4]decyl groups;
divalent spiro[5,5]undecyl groups.

Particularly preferred alicylic compound (H$^c$) include notably:
1,2-cyclobutanediol difluoroformate;
1,3-cyclobutanediol difluoroformate;
2,2,4,4-tetramethyl-1,3-cyclobutanediol difluoroformate;
1,1-cyclobutanedimethanol difluoroformate;
cis- and trans-1,2-cyclohexanediol difluoroformate;
1,4-cyclohexanediol difluoroformate;
cis- and trans-1,3-cyclohexanediol difluoroformate;
1,4-cyclohexanedimethanol difluoroformate;
4-methyl-1,2-cyclohexanedimethanol difluoroformate.

In the listed alicylic compound (H'), it is understood that the expression " . . . di( . . . )ol difluoroformate" is meant to refer to the fluoroformate derivative of the hydroxy-compound named as " . . . di( . . . )ol".

Particularly preferred is 1,4-cyclohexanedimethanol difluoroformate, which, for the avoidance of doubt possesses formula:

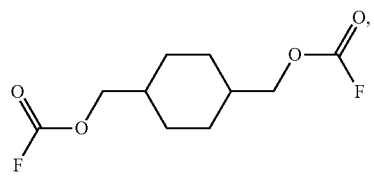 [SMILES: O=C(F)OCC1CCC(COC(=O)F)CC1]

Among aromatic compounds ($H^c$), preferred are compounds of formula:

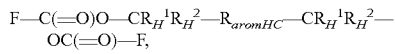

F—C(=O)O—$CR_H^1R_H^2$—$R_{aromHC}$—$CR_H^1R_H^2$—OC(=O)—F, wherein $R_H^1$ and $R_H^2$ have the meaning described above, and $R_{aromHC}$ is a divalent $C_5$-$C_{18}$ cycloaromatic group, which may be selected from groups including one or more than one:
- divalent benzylene groups;
- divalent naphthylene groups;
- divalent furylene groups;
- divalent pyridylene groups;
- divalent pyrrolylene groups;
- divalent thiophenylene groups;
- divalent aromatic groups of formula —$Ar_1$—$[W_{Ar}$—$Ar_2]_{nar}$—, wherein each of Ar1 and Ar2 are divalent aromatic groups, and preferably any of the groups listed above, $W_{Ar}$ is a bond or is a group of any of formula —O—, —C(CH$_3$)$_2$—, —SO$_2$—; —C(O)—; and nar is zero or an integer of 1 to 3, preferably is zero or 1.

Particularly preferred aromatic compounds ($H^c$) include notably those of formulae:
FOC(O)O—CH$_2$-(O)$_z$-Ph$^{para}$-C(CH$_3$)$_2$-Ph$^{para}$-(O)$_z$—CH$_2$—OC(O)—OF;
FOC(O)O—CH(O)-Ph$^{para}$-SO$_2$-Ph$^{para}$-(O)$_z$—CH$_2$—OC(O)—OF;
FOC(O)O—CH$_2$—(O)$_z$-P$^{para}$-C(O)-Ph$^{para}$—(O)$_z$—CH$_2$—O(O)—OF;
FOC(O)O—CH$_2$—(O)$_z$-Ph$^{para}$-Ph$^{para}$—(O)$_z$—CH$_2$—OC(O)—OF; and
HO—CH$_2$Ph$^{para}$-CH$_2$—OH;
wherein Ph$^{para}$ stands for a divalent para-phenylene group and z may be zero or 1.

Preferably, said compound ($H^{l\&b}$) is a compound of formula:

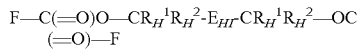

F—C(=O)O—$CR_H^1R_H^2$-$E_{HI}$-$CR_H^1R_H^2$—OC(=O)—F wherein $E_{HI}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
each of $R_H^1$ and $R_H^2$, equal to or different from each other at each occurrence, is independently H or a $C_1$-$C_6$ hydrocarbon group.

More preferably, said (oxy)alkylene group of $E_{HI}$ is linear (oxy)alkylene group, i.e. a group consisting of a sequence of —CH$_2$—, possibly including one or more than one ethereal oxygen —O—.

More preferably, said (oxy)alkylene group comprises from 1 to 10 carbon atoms, even more preferably from 1 to 6 carbon atoms, and still more preferably from 1 to 4 carbon atoms.

Preferably, said compound ($H^{l\&b}$) is selected from the group consisting of:
(H-j) F—C(O)—O—(CH$_2$)$_2$—O—C(O)—F,
(H-jj) F—C(O)—O—(CH$_2$)$_3$—O—C(O)—F,
(H-jjj) F—C(O)—O—(CH$_2$)$_4$—O—C(O)—F,
(H-jv) F—C(O)—O—(CH$_2$)$_5$—O—C(O)—F, and
(H-v) F—C(O)—O—(CH$_2$)$_2$—O—(CH$_2$)$_2$—O—C(O)—F.

In all formulae above for compound (H), more preferably, each of $R_H^1$ and $R_H^2$, equal to or different from each other at each occurrence, is independently H or a $C_1$-$C_3$ alkyl group; more preferably H or —CH$_3$; most preferably, is H.

While the molar ratio between said compound (H) and said compound (F) in Step (I) of the method of the invention is not particularly limited, it is generally understood that such ratio is generally adjusted to be within 5.0:1.0 to 1:0:5.0, preferably within 2.0:1.0 to 1.0:2.0, more preferably within 1.3:1.0 to 1.0:1.3, and even more preferably within 1.1:1.0 to 1.0:1.1, which means that the excess of acyl fluoride or fluoroformate is generally of at most 500% by moles, preferably of at most 200% moles, more preferably at most 30% by moles, even more preferably at most 10% by moles.

It is nevertheless understood that when aiming at manufacturing polymer mixture (FH$_{cyclic}$) of higher molecular weight, a substantially stoichiometric ratio between compound (H) and compound (F) will be chosen, that is to say, a ratio of about 1.0:1.0.

Result of step (I) is hence a mixtures of polymers [polymer mixture (FH$_{cyclic}$)] as above detailed. Polymers of polymer mixture (FH$_{cyclic}$) comprise the said partially fluorinated polyether backbone comprising recurring unit(s) derived from said at least one compound (F) alternately arranged with recurring unit(s) derived from said at least one compound (H), as detailed above, and comprise generally two chain ends, wherein each of said chain ends, equal to or different from each other, is generally selected from the group consisting of a group —$CR_H^1R_H^2$—OC(=O)F and a group —C(=O)F.

As said, step (I) of the method of the invention is performed in the presence of a fluoride-containing compound, more preferably in the presence of a fluoride-containing compound comprising at least one of (i) a metal fluoride of formula MeF$_y$, with Me being a metal having y valence, y being 1 or 2, in particular NaF, CaF$_2$, AgF, RbF, CsF, KF; and (ii) an (alkyl)ammonium fluoride of formula NR$^{HN}_4$F, with each of R$^{HN}$, equal to or different from each other being, independently, a H or an alkyl group, in particular tetrabutylammonium fluoride.

Said fluoride-containing compounds may be neat metal fluorides or neat (alkyl) ammonium fluorides, as above detailed, or maybe compounds whereas the said fluorides are supported onto an inert support, such as charcoal, alumina, silica, zeolites, and the like.

It is generally understood, although other mechanisms may also explain the observed reactivity, that in Step (I) of the method of the invention, reaction between compound (F) and compound (H) occurs through formation of a —CF$_2$O$^-$ nucleophile by reaction of fluoride with an acyl fluoride group of compound (F) and subsequent nucleophilic substitution of the same on the fluoroformate group of compound (H), with release of carbon dioxide and fluoride.

As a consequence, the said fluoride-containing compound can be used in catalytic amounts, being understood that fluoride anions will not be substantially consumed in Step (I).

Caesium fluoride (CsF), potassium fluoride (KF), silver fluoride (AgF), Rubidium fluoride (RbF) and tetra-n-butylammonium fluoride are the preferred fluoride-containing compounds which can be used in Step (I) of the method of the invention.

Preferably, Step (I) is performed in the presence of a solvent, more preferably in the presence of a polar aprotic solvent, although embodiments whereas no solvent is used and compounds (F) and (H) are used as reactive medium are also encompassed by the method of the invention.

When used, preferably, said polar aprotic solvent is selected in the group comprising, more preferably consisting of, dimethoxyethane (glyme), bis(2-methoxyethyl) ether (di-

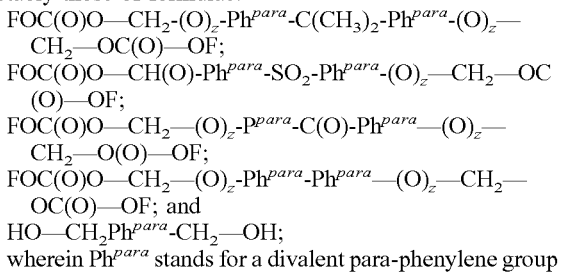

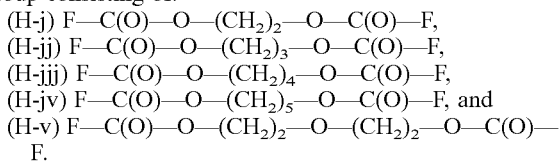

glyme), triethylene glycol dimethyl ether (tri-glyme), tetraethylene glycol dimethyl ether (tetraglyme), tetrahydrofuran, acetonitrile, dimethyl sulfoxide, dimethylformamide, ethylene polyoxides dimethylethers. Tetraglyme and acetonitrile being more preferred.

Step (I) can be performed by adding said compound (F) to said compound (H), or viceversa by adding said compound (H) to said compound (F).

According to a preferred embodiment, said compound (F) and said compound (H) are added to the reaction environment and then reaction is triggered by e.g. increase of temperature and/or addition of the said source of fluoride.

Step (I) is generally carried out at a temperature of at least 60° C., preferably of at least 80° C., more preferably at least 90° C., even more preferably of at least 110° C.

Upper boundaries for reaction temperature in Step (I) are not particularly limited; it is nevertheless generally understood that Step (I) will be carried out at a temperature which is below the temperature of Step (II), and which is generally of at most 120° C.

Preferably, after step (I), the backbone of polymer chains of said polymer mixture ($FH_{cyclic}$) consists essentially of a sequence of recurring units of formula ($FH^c_{unit}$) and formula ($F^cH_{unit}$), as described above.

More preferably, said backbone essentially consists of a sequence of recurring units of formula ($FH^c_{unit}$), as detailed above, consistently with the use of compounds ($H^c$) as raw materials.

The expression "consists essentially" as used above for characterizing the backbone of polymer chains of polymer mixture ($FH_{cyclic}$) is intended to mean that the said chain may comprise, in addition to the sequence of recurring units of formula ($FH^c_{unit}$) and formula ($F^cH_{unit}$), a minor amount of defects and/or spurious units which may derive by side reactions, being understood that the amount thereof will be such not to substantially modify the properties of the polymer mixture ($FH_{cyclic}$), e.g. an amount of less than 1% moles, with respect to the overall amount of recurring units of polymer chains of polymer mixture ($FH_{cyclic}$).

The number-averaged molecular weight of said polymers of polymer mixture ($FH_{cyclic}$) is from 210 to 50 000, preferably from 380 to 30 000, more preferably from 450 to 8 000, and even more preferably from 500 to 3000.

Polymer mixture ($FH_{cyclic}$) is generally a mixture comprising (preferably essentially consisting of) variable amounts of any of polymers of formula:

polymers ($FH^c_{FOR\text{-}FOR}$): F—C(O)—OCR$_H^1$R$_H^2$-E$_{HC}$-R$_{HC}$-E$_{HC}$-CR$_H^1$R$_H^2$—O—[CF$_2$—R$_f$—CF$_2$O—CR$_H^1$R$_H^2$-E$_{HC}$-R$_{HC}$-E$_{HC}$-CR$_H^1$R$_H^2$—O]$_{n'}$—C(O)—F;

polymers ($F^cH_{FOR\text{-}FOR}$) F—C(O)—OCR$_H^1$R$_H^2$-J$_{H}$-CR$_H^1$R$_H^2$—O—[CF$_2$-E$_f$-R$_{cf}$-E$_f$-CF$_2$O—CR$_H^1$R$_H^2$-J$_{H}$-CR$_H^1$R$_H^2$—O]$_{n'}$—C(O)—F;

polymers ($FH^c_{COF\text{-}FOR}$) F—C(O)—OCR$_H^1$R$_H^2$-E$_{HC}$-R$_{HC}$-E$_{HC}$-CR$_H^1$R$_H^2$—O—[CF$_2$—R$_f$—CF$_2$O—CR$_H^1$R$_H^2$-E$_{HC}$-R$_{HC}$-E$_{HC}$-CR$_H^1$R$_H^2$—O]$_{n''}$—CF$_2$—R$_f$—C(O)—F polymers ($F^cH_{COF\text{-}FOR}$) F—C(O)—OCR$_H^1$R$_H^2$-J$_{H}$-CR$_H^1$R$_H^2$—O—[CF$_2$-E$_f$-R$_{cf}$-E$_f$-CF$_2$O—CR$_H^1$R$_H^2$-J$_{H}$-CR$_H^1$R$_H^2$—O]$_{n''}$—CF$_2$-E$_f$-R$_{cf}$-E$_f$-C(O)—F polymers ($FH^c_{COF\text{-}COF}$) F—C(O)R$_f$—CF$_2$OCR$_H^1$R$_H^2$-E$_{HC}$-R$_{HC}$-E$_{HC}$-CR$_H^1$R$_H^2$—O—[CF$_2$—R$_f$—CF$_2$O—CR$_H^1$R$_H^2$—E$_{HC}$-R$_{HC}$-E$_{HC}$-CR$_H^1$R$_H^2$—O]$_{n'''}$—CF$_2$—R$_f$—C(O)—F polymers ($F^cH_{COF\text{-}COF}$) F—C(O)R$_f$—CF$_2$OCR$_H^1$R$_H^2$-J$_{H}$-CR$_H^1$R$_H^2$—O—[CF$_2$-E$_f$-R$_{cf}$-E$_f$-CF$_2$O—CR$_H^1$R$_H^2$-J$_{H}$-CR$_H^1$R$_H^2$—O]$_{n'''}$—CF$_2$-E$_f$-R$_{cf}$-E$_f$-C(O)—F wherein n', n'', and n''' are integers such that the molecular weight of the polymers of mixture ($FH^c_{FOR}$) is within the above recited boundaries, i.e. from 210 to 50 000, preferably from 380 to 30 000, more preferably from 450 to 8 000, and even more preferably from 500 to 3 000; and R$_f$, E$_f$, R$_{cf}$, E$_{HC}$, R$_{HC}$, J$_H$, R$_H^1$ and R$_H^2$ have the meanings as detailed above.

The expression "essentially consisting" when used in combination with the expression "polymer mixture ($FH_{cyclic}$)" for characterizing components amounting the polymer mixture ($FH_{cyclic}$) is understood to mean that additional compounds which maybe formed because of side-reactions or because of the presence of impurities and/or spurious ingredients, may be present in the mixture It will be clear to those skilled in the art, that while the reaction conditions of step (I) are controlled, relative amounts of polymers ($FH^c_{FOR\text{-}FOR}$), ($F^cH_{FOR\text{-}FOR}$), ($FH^c_{COF\text{-}FOR}$), ($F^cH_{COF\text{-}FOR}$), ($FH^c_{COF\text{-}COF}$) and ($F^cH_{COF\text{-}COF}$) can be adjusted, considering notably stoichiometry of the reaction, and reactivity of compound (H) and compound (F).

It is nevertheless generally understood that, acting notably on relative molar amounts of compound (F) and compound (H), considering reactivity of —COF and —O—C(O)—F groups under different reaction conditions, the method of the invention can be tuned to lead polymer mixture ($FH_{cyclic}$) comprising polymers of any of formulae ($FH^c_{FOR\text{-}FOR}$), ($F^cH_{FOR\text{-}FOR}$), ($FH^c_{COF\text{-}FOR}$), ($F^cH_{COF\text{-}FOR}$), ($FH^c_{COF\text{-}COF}$) and ($F^cH_{COF\text{-}COF}$), as above detailed, in amounts:

such that polymers ($FH^c_{COF\text{-}FOR}$) and ($F^cH_{COF\text{-}FOR}$) are the major ingredient of the polymer mixture ($FH_{cyclic}$), specifically for cases whereas monofunctional derivatives are intended to be manufactured; or such that polymers of formula ($FH^c_{COF\text{-}COF}$) and ($F^cH_{COF\text{-}COF}$) are the major ingredients of the polymer mixture ($FH_{cyclic}$), specifically for cases whereas difunctional derivatives are intended to be manufactured;

such that polymers of formula ($FH_{FOR\text{-}FOR}$) and ($F^cH_{FOR\text{-}FOR}$) are the major ingredients of the polymer mixture ($FH_{cyclic}$), specifically for cases whereas non-functional derivatives or difunctional derivatives are intended to be manufactured.

Generally, when compounds ($H^c$) are reacted with compounds (F), as above detailed, said polymer mixture ($HF_{cyclic}$) is actually a mixture essentially consisting of polymers ($FH^c_{FOR\text{-}FOR}$), ($FH^c_{COF\text{-}FOR}$), and ($FH^c_{COF\text{-}COF}$) as above detailed, whereas their relative amount can be adjusted, considering notably stoichiometry of the reaction, and reactivity of compound ($H^c$) and compound (F). Said mixture will be hereunder referred as polymer mixture ($FH^c_{cyclic}$), and is a preferred embodiment of the present invention.

As explained above, the method of the invention can be tuned to lead polymer mixture ($FH^c_{cyclic}$) comprising polymers of any of formulae ($FH^c_{FOR\text{-}FOR}$), ($FH^c_{COF\text{-}FOR}$), and ($FH^c_{COF\text{-}COF}$) as above detailed, in amounts:

such that polymer ($FH^c_{COF\text{-}FOR}$) is the major ingredient of the polymer mixture ($FH^c_{cyclic}$), specifically for cases whereas monofunctional derivatives are intended to be manufactured; or such that polymer ($FH^c_{COF\text{-}COF}$) is the major ingredient of the polymer mixture ($FH^c_{cyclic}$), specifically for cases whereas difunctional derivatives are intended to be manufactured; or such that polymer ($FH^c_{FOR\text{-}FOR}$) is the major ingredient of the polymer mixture ($FH^c_{cyclic}$), specifically for cases whereas difunctional or non-functional derivatives are intended to be manufactured.

The method of the invention may comprise a Step (II), which is a step of heating said polymer ($FH_{cyclic}$) obtained in step (I) above at a temperature exceeding 120° C., preferably in the range from 130° C. to 210° C., for a duration of at least 4 hours and in the presence of a fluoride-containing compound, typically in the presence of a fluoride-containing compound comprising at least one of (i) a metal fluoride of formula $MeF_y$, with Me being a metal having y valence, y being 1 or 2, in particular NaF, $CaF_2$, AgF, RbF, CsF, KF; and (ii) an (alkyl)ammonium fluoride of formula $NR^{HN}_4F$, with each of $R^{HN}$, equal to or different from each other being, independently, a $H$ or an alkyl group, in particular tetrabutylammonium fluoride, so effecting the thermolysis of at least a fraction of the chain ends of polymer ($FH_{cyclic}$) of formula —$CR_H^1R_H^2$—OC(=O)F to groups —$CR_H^1R_H^2$—F, to provide polymer mixture ($FH_{cyclic\_CH2F}$).

More generally, as said, in Step (II) of the method of the invention, thermolysis of at least a fraction of the chain ends of polymer mixture ($FH_{cyclic}$) of formula —$CR_H^1R_H^2$—OC(=O)F to groups —$CR_H^1R_H^2$—F occurs, whereas $R_H^1$ and $R_H^2$ have the meaning detailed above.

Step (II) could be a separated step from Step (I) or may occur simultaneously as Step (I), as the reaction between compound (F) and compound (H) progresses, depending on the temperature in Step (I).

Nevertheless, in order to achieve substantial thermolysis of chain ends of formula —$CR_H^1R_H^2$—OC(=O)F to groups —$CR_H^1R_H^2$—F, it is essential for Step (II) to include heating at a temperature exceeding 120° C., and preferably of at least 130° C., even more preferably of at least 140° C. for a duration of at least 4 hours.

As said, in said Step (II), a fluoride-containing compound has to be present, for effectively catalyse the said thermolysis of said of chain ends of formula —$CR_H^1R_H^2$—OC(=O)F to groups —$CR_H^1R_H^2$—F.

The said fluoride-containing compound may be the same compound as used in Step (I) or may be a different compound. Generally, preferred are embodiment's wherein Step (I) and Step (II) are carried out in the presence of the same fluoride-containing compound, and wherein the said fluoride-containing compound is added to the reaction mixture used in Step (I), and is hence present in appropriate amount in the polymer mixture ($FH_{cyclic}$).

In case the amount of fluoride-containing compound present in polymer mixture ($FH_{cyclic}$) is not appropriate for optimizing the thermolysis conditions in Step (II), it may be possible:

either to separate at least a fraction of the fluoride-containing compound present in polymer mixture ($FH_{cyclic}$), in case its amount, at the end of Step (I), is too high; or to add at least a fraction of additional fluoride-containing compound to polymer mixture ($FH_{cyclic}$), in case its amount, at the end of Step (I), is too low.

As said, Step (II) of method of the invention effects thermolysis of at least a fraction of the chain ends of polymer mixture ($FH_{cyclic}$) of formula —$CR_H^1R_H^2$—OC(=O)F to groups —$CR_H^1R_H^2$—F, so as to obtain a polymer mixture ($FH_{cyclic\_CH2F}$).

The number-averaged molecular weight of said polymer mixture ($FH_{cyclic\_CH2F}$) is advantageously of from 210 to 50 000, preferably from 380 to 30 000, more preferably from 450 to 8 000, and even more preferably from 500 to 5 000.

Polymer mixture ($FH_{cyclic\_CH2F}$) is generally a mixture comprising (preferably essentially consisting of) variable amounts of any of polymers of formula:

polymers ($FH^c_{CH2F-CH2F}$) F-$CR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]n-$CF_2$—$R_f$—$CF_2O$—$CR_H^1R_H^2$-EH-$CR_H^1R_H^2$—F;

polymers ($F^cH_{CH2F-CH2F}$) F-$CR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n*}$—$CF_2$-$E_f$-$R_{cf}$-$E_f$-$CF_2O$—$CR_H^1R_H^2$-$E_H$-$CR_H^1R_H^2$—F;

polymers ($FH^c_{COF-CH2F}$) F-$CR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]$_{n**}$—$CF_2$—$R_f$—C(O)—F;

polymer ($F^cH_{COF-CH2F}$) F-$CR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n**}$—$CF_2$-$E_f$-$R_{cf}$-$E_f$-C(O)—F;

polymers ($FH^c_{FOR-FOR}$) F—C(O)—$OCR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]$_{n'}$—C(O)—F;

polymers ($F^cH_{FOR-FOR}$) F—C(O)—$OCR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n'}$—C(O)—F;

polymers ($FH^c_{CH2F-FOR}$) F-$CR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]$_{n'}$—C(O)—F;

polymers ($F^cH_{CH2F-FOR}$) F-$CR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n'}$—C(O)—F;

polymers ($FH^c_{COF-FOR}$) F—C(O)—$OCR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]$_{n'''}$—$CF_2$—$R_f$—C(O)—F;

polymers ($F^cH_{COF-FOR}$) F—C(O)—$OCR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n'''}$—$CF_2$-$E_f$-$R_{cf}$-$E_f$-C(O)—F;

polymers ($FH^c_{COF-COF}$) F—C(O)R—$CF_2OCR_H^1R_H^2$-$E_{HC}$-$R_{HC}$-$E_{HC}$-$CR_H^1R_H^2$—O—[$CF_2$—$R_f$—$CF_2O$—$CR_H^1R_H^2$-$E_{HC}$-$R_{HC}$-$E_{HC}$-$CR_H^1R_H^2$—O]$_{n'''}$—$CF_2$—$R_f$—C(O)—F;

polymers ($F^cH_{COF-COF}$) F—C(O)-$E_f$-$R_{cf}$-$E_f$-$CF_2OCR_H^1R_H^2$-$J_H$-$CR_H^1R_H^2$—O—[$CF_2$-$E_f$-$R_{cf}$-$E_f$-$CF_2O$—$CR_H^1R_H^2$-$J_H$-$CR_H^1R_H^2$—O]$_{n'''}$—$CF_2$-$E_f$-$R_{cf}$-$E_f$-C(O)—F wherein n*, n**, n', n", and n''' are integers such that the molecular weight of the polymer mixture ($FH_{cyclic\_CH2F}$) is within the above recited boundaries, and wherein $R_f$, $J_H$, $E_f$, $R_{cf}$, $R_{HC}$, $E_{HC}$, $R_H^1$ and $R_H^2$ are as above detailed.

The skilled in the art will recognize that compounds ($FH^c_{FOR-FOR}$), ($F^cH_{FOR-FOR}$), ($FH^c_{COF-FOR}$), ($F^cH_{COF-FOR}$), ($FH^c_{CH2F-FOR}$), ($F^cH_{CH2F-FOR}$) and ($FH^c_{COF-COF}$), and ($F^cH_{COF-COF}$), herein above, are indeed representative of un-reacted or partially reacted components of polymer mixture ($FH_{cyclic}$).

Among those compound, in polymer mixture ($FH_{cyclic\_CH2F}$):

the concentration of polymers ($FH^c_{CH2F-CH2F}$) and ($F^cH_{CH2F-CH2F}$), as above detailed, is higher than the concentration of polymers ($FH^c_{FOR-FOR}$) and ($FCH_{FOR-FOR}$), as above detailed; and/or the concentration of polymers ($FH^c_{COF-CH2F}$) and ($F^cH_{COF-CH2F}$), as above detailed, is higher than the concentration of polymers ($FH^c_{COF-FOR}$) and formula ($F^cH_{COF-FOR}$).

Generally, conditions in Step (II) are adapted so as to cause thermolysis of more than 50%, preferably more than 60%, more preferably more than 70% of chain ends of polymer mixture ($FH_{cyclic}$) of formula —$CR_H^1R_H^2$—OC(=O)F, with respect to the total amount of said chain ends of formula —$CR_H^1R_H^2$—OC(=O)F, as resulting from Step (I), with $R_H^1$ and $R_H^2$ having the meaning as detailed above.

The Applicant noted that by tuning heating temperature and heating duration in Step (II), a complete or partial transformation of said groups —$CR_H^1R_H^2$OC(=O)F into groups —$CR_H^1R_H^2$F can be obtained, with $R_H^1$ and $R_H^2$ having the meaning as detailed above.

A polymer mixture ($FH_{cyclic\_CH2F}$), as above detailed, wherein the concentration of chain ends of formula —$CR_H^1R_H^2$—F (preferably of formula —$CH_2$—F) exceed the concentration of chain ends of formula —$CR_H^1R_H^2$—OC(=O)F (preferably of formula —$CH_2$—OC(=O)F), is another aspect of the present invention, with $R_H^1$ and $R_H^2$ having the meaning as detailed above.

According to certain preferred embodiments, the method of the invention can be adjusted to provide a polymer mixture ($FH_{cyclic\_CH2F}$) comprising an amount of polymers ($FH^C_{COF-CH2F}$): F—$CR_H^1R_H^2$-$E_{HC}$-$R_{HC}$-$E_{HC}$-$CR_H^1R_H^2$—O—[$CF_2$—$R_f$—$CF_2$O—$CR_H^1R_H^2$-$E_{HC}$-$R_{HC}$-$E_{HC}$-$CR_H^1R_H^2$—O]$_{n}$—$CF_2$—$R_f$—C(O)—F, as above detailed, and polymers ($F^CH_{COF-CH2F}$) F-$CR_H^1R_H^2$-$J_H$-$CR_H^1R_H^2$—O—[$CF_2$-$E_f$-$R_{cf}$-$E_f$-$CF_2$O—$CR_H^1R_H^2$-$J_H$-$CR_H^1R_H^2$—O]$_{n}$—$CF_2E_f$-$R_{cf}$-$E_f$-C(O)—F, as above detailed, wherein $E_{HC}$, $R_{HC}$, $J_H$, $R_f$, $R_{cf}$, $E_f$, n**, $R_H^1$ and $R_H^2$ have the meaning as detailed above, of at least 60% moles, preferably of at least 70% moles, more preferably at least 80% moles, with respect to the total moles of compounds of polymer mixture ($FH_{cyclic\_CH2F}$), as above detailed. We'll refer to this mixture as polymer mixture ($FH_{cyclic\_CH2F}^{MONO}$)

To lead to the mixture ($FH_{CH2F}^{MONO}$), molar ratio between compound (H) and compound (F) in Step (I) will be adapted to provide for a mixture ($FH_{cyclic}$), comprising polymers ($FH^c_{COF-FOR}$) and ($F^CH_{COF-FOR}$), as detailed above, of at least 60% moles, preferably of at least 70% moles, more preferably at least 80% moles, with respect to the total moles of polymers ($FH_{cyclic}$), as above detailed (hereby referred to as polymer mixture ($FH_{cyclic}^{MONO}$); which mixture upon thermolysis in Step (II), under appropriate conditions, would lead to said mixture ($FH_{cyclic\_CH2F}^{MONO}$).

According to other embodiments, the method of the invention can be adjusted to provide a polymer mixture ($FH_{cyclic\_CH2F}$) comprising polymers ($FH^c_{CH2F-CH2F}$) and ($F^c_{HCH2F-CH2F}$), as above detailed, in an amount of at least 60% moles, preferably of at least 70% moles, more preferably at least 80% moles, with respect to the total moles of polymers of polymer mixture ($FH_{cyclic\_CH2F}$). We'll refer to this mixture as polymer mixture ($FH_{cyclic\_CH2F}^{NEUTRAL}$).

To lead to the mixture ($FH_{cyclic\_CH2F}^{NEUTRAL}$), molar ratio between compound (H) and compound (F) in Step (I) will be adapted to provide for a polymer mixture ($FH_{cyclic}$), comprising polymers ($FH_{FOR-FOR}$) and ($FCH_{FOR-FOR}$), as detailed above, of at least 60% moles, preferably of at least 70% moles, more preferably at least 80% moles, with respect to the total moles of compounds of a polymer mixture ($FH_{cyclic}$) (hereby referred to as polymer mixture ($FH_{cyclic}^{NEUTRAL}$); which mixture upon thermolysis in Step (II), under appropriate conditions, would lead to said mixture ($FH_{cyclic\_CH2F}^{NEUTRAL}$).

According to other embodiments, the method of the invention can be adjusted to provide a polymer mixture ($FH_{cyclic\_CH2F}$) comprising of polymers ($F^CH_{COF-COF}$) and ($FH^c_{COF-COF}$), as above detailed, in an amount of at least 60% moles, preferably of at least 70% moles, more preferably at least 80% moles, with respect to the total moles of polymers of polymer mixture ($FH_{cyclic\_CH2F}$). We'll refer to this mixture as polymer mixture ($FH_{cyclic\_CH2F}^{BIFUNCTIONAL}$).

To lead to the mixture ($FH_{cycliccic\_CH2F}^{BIFUNCTIONAL}$), molar ratio between compound (H) and compound (F) in Step (I) will be adapted to provide for a polymer mixture ($FH_{cyclic}$), comprising polymers ($FH^c_{COF-COF}$) and ($F^CH_{COF-COF}$), as detailed above, in an amount of at least 60% moles, preferably of at least 70% moles, more preferably at least 80% moles, with respect to the total moles of compounds of a polymer mixture ($FH_{cyclic}$) (hereby referred to as polymer mixture ($FH_{cyclic}^{BIFUNCTIONAL}$); which mixture upon thermolysis in Step (II), under appropriate conditions, would lead to said mixture ($FH_{cyclic\_CH2F}^{BIFUNCTIONAL}$).

According to certain preferred embodiments, Step (II) of the method of the invention causes thermolysis of substantially all chain ends of polymer mixture ($FH_{FOR}$) of formula —$CR_H^1R_H^2$—OC(=O)F, with respect to the total amount of said chain ends of formula -$CR_H^1R_H^2$—OC(=O)F, as resulting from Step (I). In other words, this means that characterization techniques used for identifying and quantifying chain ends of polymer mixture ($FH_{cyclic\_CH2F}$) do not enable detecting any significant amount of —$CR_H^1R_H^2$—OC(=O)F groups, or in other terms that their concentration is below the limit of detection of the said characterization techniques, whereas $R_H^1$ and $R_H^2$ have the meaning as detailed above.

According to these preferred embodiments involving complete thermolysis (leading to no detectable amount of —$CR_H^1R_H^2$—OC(=O)F groups), polymer mixture ($FH_{CH2F}$) is preferably a mixture comprising (preferably essentially consisting of) variable amounts of any of compounds of formula ($FH^c_{CH2F-CH2F}$), formula ($F^CH_{CH2F-CH2F}$), formula ($FH^c_{COF-CH2F}$), formula ($F^c_{HCOF-CH2F}$), formula ($FH^c_{COF-COF}$) and formula ($F^CH_{COF-COF}$), as detailed above.

As previously explained, polymer mixture ($FH_{CH2F}$) is preferably a mixture comprising (preferably essentially consisting of) variable amounts of any of compounds of formula ($FH^c_{CH2F-CH2F}$), formula ($FH^c_{COF-CH2F}$), and formula ($FH^c_{COF-COF}$), as detailed above, which is the consequence of using a compound (H$^c$), as detailed above in Step (I).

According to certain embodiments of the present invention, the method as above detailed comprises an additional Step (111) including contacting polymer mixture ($FH_{cyclic}$) or ($FH_{cyclic\_CH2F}$) with a source of fluorine enabling at least partial fluorination of said polymer mixtures ($FH_{cyclic}$) or ($FH_{cyclic\_CH2F}$), so as to obtain a fluorinated polymer mixture ($FF_{cyclic}$) or ($FF_{CF3}$).

In other terms, a Step (III) of fluorination may be carried out on the mixture obtained from Step (I) or may be carried out after having submitted said mixture to Step (II), as above detailed.

Advantageously, through fluorination of polymer mixture ($FH_{cyclic}$) or ($FH_{CH2F}$), at least a fraction of hydrogen atoms of moieties —$CR_H^1R_H^2$-$J_H$-$CR_H^1R_H^2$— and —$CR_H^1R_H^2$-$E_{HC}$-$R_{HC}$-$E_{HC}$-$CR_H^1R_H^2$— (with $J_H$, $E_{HC}$, $R_{HC}$, $R_H^1$ and $R_H^2$ having the meaning indicated above), derived from compound (H), as above detailed, are replaced by fluorine atoms.

Similarly, through fluorination of polymer mixture ($FH_{cyclic}$) or ($FH_{CH2F}$), if compound (F) is not perfluorinated, at least a fraction of hydrogen atoms of moieties -$E_f$-$R_{cf}$-$E_f$— and —$R_f$—, derived from compound (F), as above detailed, are replaced by fluorine atoms.

While fluorinating a polymer mixture ($FH_{cyclic}$) or ($FH_{CH2F}$), whose constituting polymers comprise heteroatoms such as N or S in the backbone, is possible, such fluorination may give rise to side reactions whereas these N or S atoms may modify their connections to the backbone. So, it is generally understood that it would be generally preferred to submit to fluorination polymer mixtures ($FH_{cyclic}$) or ($FH_{CH2F}$), as above detailed, but wherein no heteroatom N or S is comprised in the structure of its constituting polymers.

Further, while fluorinating a polymer mixture ($FH_{cyclic}$) or ($FH_{CH2F}$), whose constituting polymers comprise aromatic moieties in the backbone, is possible, such fluorination may give rise to corresponding fluorinated counterparts whereas the aromatic character of the aromatic moiety of the polymers of polymer mixtures ($FH_{cyclic}$) or ($FH_{CH2F}$), may be lost. For instance, extensive fluorination of an aromatic moiety may give rise to corresponding saturated and fully fluorinated structure, or may give rise, depending on conditions, to other forms of saturated or unsaturated cyclic or non-cyclic moieties. So, it is generally understood that it would be generally preferred to submit to fluorination polymer mixtures ($FH_{cyclic}$) or ($FH_{CH2F}$), as above detailed, but wherein no aromatic moiety is comprised in the structure of its constituting polymers.

According to preferred embodiments, substantially all hydrogen atoms of said moieties are replaced in Step (III) with fluorine atoms, so that said moieties $—CR_H^1R_H^2—J_H$- $CR_H^1R_H^2—$, $—CR_H^1R_H^2$-$E_{HC}$-$R_{HC}$-$E_{HC}$-$CR_H^1R_H^2—$, -$E_f$- $R_{cf}$-$E_f$- and $—R_f$— are transformed into groups of formula $—CR_F^1R_F^2$-$J_F$-$CR_F^1R_F^2—$, $—CR_F^1R_F^2$-$E^{FC}$-$R_{FC}$-$E_{FC}$-$CR_F^1R_F^2—$, and -$E_{fF}$-$R_{cfF}$-$E_{fF}$- and $—R_{fF}—$ wherein:
- $J_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;
- each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;
- $R_{FC}$ is divalent perfluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S; and
- each of $R_F^1$ and $R_F^2$, equal to or different from each other, is independently F or a $C_1$-$C_6$ perfluorocarbon group, preferably F or a $C_1$-$C_3$ perfluoroalkyl group, more preferably F or $—CF_3$, most preferably F;
- $R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: -$E_{fF}$-$R_{cfF}$-$E_{fF}$-;
- $R_{cfF}$ is a divalent perfluorocarbon cyclic group, which may be a perfluorocycloaliphatic, which may comprise one or more than one cyclic moiety, and which may comprise one or more than one oxygen atom included in the cycle;
- each of $E_{fF}$, equal to or different from each other, is a bond, or a divalent perfluorocarbon group, possibly comprising one or more than one heteroatoms selected from Cl, and O.

Preferably, the source of fluorine in Step (III) is a gas containing molecular fluorine. More preferably, said source of fluorine is fluorine gas ($F_2$).

Advantageously, the source of fluorine in step (III) is used in admixture with a diluting gas, preferably selected from inert gas, such as helium and nitrogen.

Advantageously, in Step (III), a halogenated olefin may be contacted with polymer mixture ($FH_{cyclic}$) or ($FH_{cyclic\_CH2F}$) and fluorine source, in order to advantageously generate fluorine radicals promoting fluorination of polymer mixture ($FH_{cyclic}$) or ($FH_{cyclic\_CH2F}$). Said halogenated olefin can be selected for example from tetrafluoroethylene (TFE), hexafluoropropylene (HFP), octafluorobutene, perfluoropentene, perfluorohexene, perfluoroheptene, perfluorooctene, perfluorocyclobutene, perfluorocyclopentene, perfluorocyclohexene, chlorotrifluoroethylene (CTFE), dichlorodifluoroethylene, chloropentafluoropropene, perfluorobutadiene, perfluoro-methylvinylether, perfluoro-ethylvinylether, perfluoro-propylvinylether; $CF_3OClC=CClF$, trichloroethylene, tetrachloroethylene, dichloroethylene isomers; and fluorodioxoles.

In embodiments wherein fluorination leads to substitution of substantially all hydrogen atoms in polymer mixture ($FH_{cyclic}$) or ($FH_{cyclic\_CH2F}$), after step (III), the backbone of polymer chains of said polymer mixture ($FF_{cyclic}$) or ($FF_{CF3}$) consists essentially of a sequence of recurring units of formula ($FF_{unit}$):

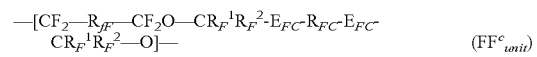  (FF$^c_{unit}$)

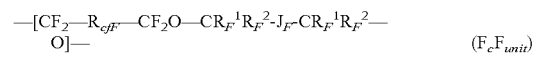  (F$_c$F$_{unit}$)

wherein
- $J_F$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;
- each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;
- $R_{FC}$ is divalent perfluorocarbon cyclic group, which may be a cycloaliphatic group, which may comprise one or more than one cyclic moiety, and which may comprise one or more than one heteroatom included in the cycle, said heteroatom being selected from N, O and S; and
- each of $R_F^1$ and $R_F^2$, equal to or different from each other, is independently F or a $C_1$-$C_6$ fluorocarbon group, preferably F or a $C_1$-$C_3$ perfluoroalkyl group, more preferably F or $—CF_3$, most preferably F;
- $R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: -$E_{fF}$-$R_{cfF}$-$E_{fF}$-;
- $R_{cfF}$ is a divalent perfluorocarbon cyclic group, which may be a perfluorocycloaliphatic, which may comprise one or more than one cyclic moiety, and which may comprise one or more than one oxygen atom included in the cycle;
- each of $E_{fF}$, equal to or different from each other, is a bond, or a divalent perfluorocarbon group, possibly comprising one or more than one heteroatoms selected from Cl, and O.

According to a first variant, the Step (III) of fluorination is carried out on polymer mixture ($FH_{cyclic\_CH2F}$) as obtained from Step (II), possibly after standard separation/purification steps.

According to this first variant of Step (III), generally, end chains of polymers of polymer mixture ($FH_{cyclic\_CH2F}$) either of formula —C(O)—F or of formula —O(CO)—F will not be affected by fluorination in Step (III); rather C—H bonds will be substantially replaced, both in the polymer chains and in end groups of formula —$CR_H^1R_H^2F$, which will be transformed into —$CR_F^1R_F^2F$ groups, with $R_H^1$, $R_H^2$, $R_F^1$, and $R_F^2$ having the meaning as detailed above.

During any work-up of polymer mixture ($FH_{cyclic\_CH2F}$), it is generally preferred to avoid exposing compounds of that mixture wherein one or both chain ends are acyl fluoride —C(O)—F group(s) to conditions where hydrolysis may take place.

Indeed, under hydrolysis conditions, said —C(O)F groups may give rise to corresponding carboxylic acid groups —COOH, which may not be stable under fluorinating conditions of Step (III).

More specifically, polymers ($FH^c_{COF-CH2F}$), ($F^cH_{COF-CH2F}$), ($FH^c_{COF-FOR}$), ($F^cH_{COF-FOR}$), ($FH^c_{COF-COF}$) and ($F^cH_{COF-COF}$) may undergo, during work-up of Step (II), in case said work-up expose the mixture to moisture, to partial (or even total) conversion to corresponding hydrolysed acid derivatives listed below:

polymer ($FH^c_{COOH-CH2F}$) F—$CR_H^1R_H^2$-$E_{HC}$-$R_{HC}$-$E_{HC}$-$CR_H^1R_H^2$—O—[$CF_2$—$R_f$—$CF_2$O—$CR_H^1R_H^2$-$E_{HC}$-$R_{HC}$-$E_{HC}$-$CR_H^1R_H^2$—O]$_{n^{**}}$—$CF_2$—RR—C(O)—OH;

polymer ($F^cH_{COOH-CH2F}$) F—$CR_H^1R_H^2$-$J_H$-$CR_H^1R_H^2$—O—[$CF_2$-$E_f$-$R_{cf}$-$E_f$-$CF_2$O—$CR_H^1R_H^2$-$J_H$-$CR_H^1R_H^2$—O]$_{n^{**}}$—$CF_2$-$E_f$-$R_{cf}$-$E_f$-C(O)—OH;

polymer ($FH^c_{COOH-FOR}$) F—C(O)—$OCR_H^1R_H^2$-$E_{HC}$-$R_{HC}$-$E_{HC}$-$CR_H^1R_H^2$—O—[$CF_2$—$R_f$—$CF_2$O—$CR_H^1R_H^2$-$E_{HC}$-$R_{HC}$-$E_{HC}$-$CR_H^1R_H^2$—O]$_{n'''}$—$CF_2$—$R_f$—C(O)—OH;

polymer ($F^cH_{COOH-FOR}$) F—C(O)—$OCR_H^1R_H^2$-$J_H$-$CR_H^1R_H^2$—O—[$CF_2$-$E_f$-$R_{cf}$-$E_f$-$CF_2$O—$CR_H^1R_H^2$-$J_H$-$CR_H^1R_H^2$—O]$_{n'''}$—$CF_2$-$E_f$-$R_{cf}$-$E_f$-C(O)—OH;

polymer ($FH^c_{COOH-COOH}$)HO—C(O)$R_f$-$CF_2OCR_H^1R_H^2$-$E_{HC}$-$R_{HC}$-$E_{HC}$-$CR_H^1R_H^2$—O—[$CF_2$—$R_f$—$CF_2$O—$CR_H^1R_H^2$-$E_{HC}$-$R_{HC}$-$E_{HC}$-$CR_H^1R_H^2$—O]$_{n'''}$—$CF_2$—$R_f$—C(O)—OH;

polymer ($F^cH_{COOH-COOH}$) HO—C(O)-$E_f$-$R_{cf}$-$E_f$-$CF_2OCR_H^1R_H^2$-$J_H$-$CR_H^1R_H^2$—O—[$CF_2$-$E_f$-$R_{cf}$-$E_f$-$CF_2$O—$CR_H^1R_H^2$-$J_H$-$CR_H^1R_H^2$—O]$_{n'''}$—$CF_2$-$E_f$-$R_{cf}$-$E_f$-C(O)—OH;

wherein n**, n''', and n''' are integers such that the molecular weight of the polymer mixture ($FH_{cyclic\_CH2F}$) is within the above recited boundaries, and wherein $R_f$, $E_f$, $R_{cf}$, $J_H$, $E_{HC}$, $R_{HC}$, $R_H^1$ and $R_H^2$ are as above detailed.

During fluorination, terminal carboxylic group bound to a fluorinated carbon of the moiety $R_f$ may decarboxylate, liberating $CO_2$ and HF, thus leading to additional "non-functional" end-groups.

In particular, hydrolysed acid derivatives comprising —COOH groups may undergo, during fluorination Step (III), to partial (or even total) decarboxylation to corresponding fluorinated neutral derivatives whereas the group —C(O)OH is substituted by a group —F.

According to first variant of Step (III), mixture ($FF_{CF3}^{MONO}$) can be obtained from polymer mixture ($FH_{cyclic\_CH2F}^{MONO}$) as above detailed through fluorination in Step (III) as above detailed, under appropriate conditions, so as to advantageously ensure extensive/exhaustive fluorination and replacement of substantially all C-H bonds with C—F bonds.

According to first variant of Step (III), but according to other embodiments, the method of the invention can be adjusted to provide a polymer mixture ($FF_{CF3}^{NEUTRAL}$), when a mixture ($FH_{CH2F}^{NEUTRAL}$), as above detailed, is submitted in Step (III) to fluorination conditions so as to ensure extensive/exhaustive fluorination and replacement of substantially all C-H bonds with C—F bonds.

According to a second variant, before carrying out Step (III) of fluorination, polymer mixture ($FH_{CH2F}$) as obtained from Step (II) is submitted to at least one Step (III$^4$) of derivatization, modifying the chemical nature of acyl fluoride and/or fluoroformate end groups, to yield mixture ($FH_{cyclic\_CH2F-derivative}$). It is generally understood that end groups of polymer mixture ($FH_{cyclic\_CH2F-dervative}$) will be made more stable notably against hydrolysis and decarboxylation over corresponding acyl fluoride and/or fluoroformate groups, originally comprised in polymer mixture ($FH_{cyclic\_CH2F}$) as obtained from Step (II).

In particular, in this second variant, according to certain embodiments, in Step (III$^4$), polymer mixture ($FH_{cyclic\_CH2F}$) may be reacted under esterification conditions in the presence of an alcohol of formula $R_h$OH, with $R_h$ being a $C_1$-$C_3$ hydrocarbon group, e.g. $CH_3$, $C_2H_5$, $C_3H_7$, preferably $C_2H_5$; to provide for polymer mixture ($FH_{cyclic\_CH2F-ester/carbonate}$), and then fluorinated to provide for corresponding fluorinated polymer mixture ($FF_{cyclic\_CF3-ester/carbonate}$).

This step of esterification of polymer mixture ($FH_{cyclic\_CH2F}$) is notably effective in substantially avoiding the presence of derivatives possessing COOH end groups, which may undergo decarboxylation under fluorination Step (III).

Polymer mixtures ($FH_{cyclic}$), ($FH_{cyclic\_CH2F}$), ($FH_{cyclic\_CH2F-ester-carbonate}$), ($FF_{cyclic\_CF3-ester-carbonate}$) and ($FF_{CF3}$) can be used as such, or can be further modified using:

(i) reactivity of —C(O)F [be those —C(O)—F groups as in mixture ($FH_{cyclic}$), as in mixture ($FH_{cyclic\_CH2F}$) and as in mixture ($FF_{CF3}$); or as esters as in mixture ($FH_{CH2F-ester-carbonate}$) and in mixture ($FF_{CF3-ester-carbonate}$)] and/or (ii) reactivity of —O—C(O)—F groups [be those —O—C(O)—F groups present as —$CR_H^1R_H^2$—OC(O)—F groups as in mixture ($FH_{cyclic}$), and in mixture ($FH_{cyclic\_CH2F}$); as carbonates as in mixture ($FH_{cyclic\_CH2F-ester-carbonate}$) and in mixture ($FF_{CF3-ester-carbonate}$); or as —$CR_F^1R_F^2$—OC(O)—F groups as in mixture ($FF_{CF3}$), to create different chain ends and/or can be submitted to a variety of additional separation steps, so as to possibly isolate specific components thereof in high yields.

Whichever type of chemistry may be applied to those groups; in particular, —C(O)F groups may be submitted to hydrolysis/esterification reactions, leading to carboxyl-type end groups, including carboxylic acid, ester, amide, acyl halide other than fluoride groups, or may be reacted with different reactants starting from said acyl/carboxyl-type end groups, e.g. as described in U.S. Pat. No. 3,810,874 (MINNESOTA MINING AND MANUFACTURING COMPANY) 14 May 1974.

Hence, for instance, compound F—$CH_2$-$E_{HC}$-$R_{HC}$-$E_{HC}$-$CH_2$—O—[$CF_2$—$R_f$—$CF_2$O—$CH_2$-$E_{HC}$-$R_{HC}$-$E_{HC}$-$CH_2$—O]$_{n^{}}$—$CF_2$—$R_f$—C(O)—F of formula ($FH^c_{COF-CH2F}$) of polymer mixture ($FH_{cyclic\_CH2F}$) can be modified into a compound of formula F—CH$_2$-E$_{HC}$-R$_{HC}$-E$_{HC}$-CH$_2$—O—[CF$_2$—R$_f$—CF$_2$O—CH$_2$-E$_{HC}$-R$_{HC}$-E$_{HC}$-CH$_2$—O]$_{n^{}}$—CF$_2$—R$_f$-A of formula (FH$^c_{A\text{-}CH2F}$), wherein n**, R$_{HC}$, E$_{HC}$, and R$_f$ have the meanings defined above, and A is a group of formula —X$_a$YZ$_b$, wherein:

X a polyvalent, preferably divalent, linking organic radical, preferably selected from the group consisting of —CONR—, —COO—, —COS—, —CO—, and groups of any of formulae:

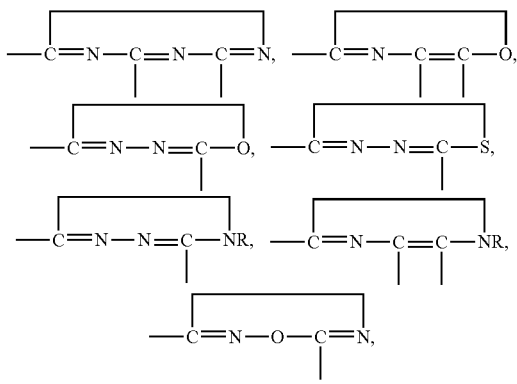

a is zero or one;
b is an integer of 1-3;
R is hydrogen, (e.g., CH$_3$, —CH$_2$CF$_3$, -C$_6$H$_{13}$), aryl of less than 13 carbon atoms (e.g., —C$_6$H$_5$, —C$_6$H$_4$CH$_3$) or —YZ$_b$ radical;
Y is a bond or a polyvalent linking organic radicals free of olefinic unsaturation such as alkylene (e.g., —CH$_2$—, —C$_2$H$_4$—), oxa-alkylene (e.g., —CH$_2$OCH$_2$—), cycloalkylene (e.g. -c-C$_6$H$_{10}$—), thia-alkylene (e.g., —CH$_2$SCH$_2$—), arylene (e.g. —C$_6$H$_4$—), or combinations thereof, such as aralkylene and alkarylene;
Z is a functional groups which may notably undergo electrophilic, nucleophilic, or free radical reaction, and which can be notably selected from the group consisting of —OH, —SH, —SR', —NR$_2$', —CO$_2$H, —SiR'$_d$Q$_{3-d}$, —CN, —NCO, >C=C<, —CO$_2$R', —OSO$_2$CF$_3$, —OCOCl, —OCN, —N(R')CN, —(O)COC(O)—, —N=C, —I, —CHO, —CH(OCH$_3$)$_2$, —SO$_2$Cl, —C(OCH$_3$)=NH, —C(NH$_2$)=NH, —C$_5$H$_4$OC$_6$H$_4$-Q, —OCR$_1$R$_2$R$_f$,

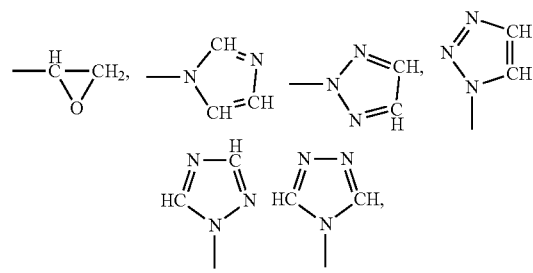

wherein R' is hydrogen, aryl, or a C$_1$-C$_6$ alkyl; Q is halogen, —OR', —OCOR', or —CH=CH$_2$; and d is or an integer of 1 to 3; R$_1$ is hydrogen, or a C$_1$-C$_6$ (fluoro)alkyl, R$_2$ is hydrogen, or a C$_1$-C$_6$ alkyl; and R$_f$ is a C$_1$-C$_6$ (fluoro)alkyl.

Similarly, compound F$_3$C-E$_{FC}$-R$_{FC}$-E$_{FC}$-CF$_2$—O—[CF$_2$—R$_f$—CF$_2$O—CF$_2$-E$_{FC}$-R$_{FC}$—E$_{FC}$-CF$_2$—O]$_{n^{}}$—CF$_2$—R$_f$—C(O)—F, of formula (FF$^c_{COF\text{-}CF3}$), as above detailed, of polymer mixture (FF$_{CF3}$) can be modified into a compound of formula F$_3$C-E$_{FC}$-R$_{FC}$-E$_{FC}$-CF$_2$—O—[CF$_2$—R$_f$—CF$_2$O—CF$_2$-E$_{FC}$-R$_{FC}$-E$_{FC}$-CF$_2$—O]$_{n^{}}$—CF$_2$—R$_f$-A, with E$_{FC}$, R$_{FC}$, n**, R$_f$ and A as above detailed.

Similarly, whichever type of chemistry may be applied to —O—C(O)F groups.

In particular, the said —CH$_2$—OC(O)—F and —CF$_2$—OC(O)—F groups may undergo hydrolysis/esterification reactions, leading, respectively to —CH$_2$—OC(O)—OR* groups, with R* being a (halo)hydrocarbon group; or —C(O)—R* with R* being a (halo)hydrocarbon group; acid/esters or carbonate acid/ester groups may be further reacted with different reactants starting from said acyl/carboxyl-type end groups, e.g. as described notably in U.S. Pat. No. 3,810,874 (MINNESOTA MINING AND MANUFACTURING COMPANY) 14 May 1974, and as detailed above.

Polymer mixtures (FH$_{cyclic}$), (FH$_{cyclic\_CH2F}$), (FH$_{cyclic\_CH2F\text{-}ester\text{-}carbonate}$), (FF$_{cyclic\_CF3\text{-}ester\text{-}carbonate}$) and (FF$_{CF3}$), either as such, or further modified, notably as above detailed, can be used for the manufacture of additives for plastic and glass coating.

The present invention also relates to the use of mixture (FH$_{cyclic}$), (FF$_{cyclic\_CH2F}$), (FH$_{cyclic\_CH2F\text{-}ester\text{-}carbonate}$), (FF$_{cyclic\_CF3\text{-}ester\text{-}carbonate}$) and (FF$_{CF3}$), either as such, or further modified, as lubricants, notably for magnetic recording media (MRM).

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Example 1

Step 1—(A): Polycondensation of Cyclic Difluoroformiate and Diacyl Fluoride.

In a Parr autoclave (600 ml) equipped with a mechanical stirrer and a pressure transducer, dry CsF powder (Aldrich Co title 99.9%; 32.15 g, 0.21 mol), the fluoroformate F(O)CO—CH$_2$—(cC$_6$H$_{10}$)—CH$_2$OC(O)F (1) (100.00 g, 0.42 mol) (prepared from 1,4-cyclohexanedimethanol and COF$_2$) and anhydrous tetraethylene glycol dimethyl ether (120 g) were charged in a dry-box under nitrogen atmosphere. After removing the incondensable gases by vacuum at 10-5 mbar at −196° C., the perfluoromalonyl fluoride FC(O)—CF$_2$—C(O)F (2) (60.96 g, 0.42 mol) was condensed in the autoclave at liquid nitrogen temperature. The reaction mixture was heated at 120° C. by an heating mantle and kept under mechanical stirring at this temperature for 42 hours: a pressure increase, due to the CO$_2$ formation during the alkylation reaction, was observed. The obtained crude mixture was then heated at 170° C. for 45 hours in the autoclave and after the reaction was finished, the reactor was cooled down to room temperature and the gaseous products were eliminated and bubbled into a solution of NaOH at 10% (600 cc). The fluorinated phase inside the autoclave was recovered and the reaction mixture analyzed by $^1$H-NMR and $^{19}$F-NMR analyses showing the formation of the hydrofluoropolyether polymer (HFPE) (3) having a number average MW=600 with functional groups —$CF_2C(O)F$ (25% mol); —$OC(O)F$ (50% mol) and neutral terminal groups —$CH_2F$ (25% mol).

In a PFA 3 neck-round bottom flask (250 ml) equipped with a magnetic stirrer and water condenser the crude product was charged and treated with excess of anhydrous EtOH at 5° C. under nitrogen atmosphere. The reaction mixture was allowed to warm up to room temperature and then heated at 50° C. for 8 hours to convert all the acyl-fluoride and fluoroformate terminal groups to the corresponding ethyl ester and ethyl carbonate end groups. The obtained product was washed with water (150 cc×5 times) to remove the catalyst CsF, the solvent, HF and purified by fractional distillation to give the final hydrofluoropolyether polymer (HFPE) (110 g) that was characterized by $^1$H-NMR and $^{19}$F-NMR analyses.

Step 1—(B) Perfluorination of the Hydrofluoropolyether Polymer (HFPE) Obtained in Example 1A) to Give the Perfluoropolyether Polymers Containing Cycloaliphatic Structure.

11.4 g of the polymer obtained in step A are diluted in 251.1 g of 1,2,3,4-tetrachlorohexafluorobutane and loaded into a 250 ml stainless steel reactor equipped with a mechanical stirrer, two inlet pipes, a thermocouple and an outlet pipe; while keeping the reactor at 0° C. and under vigorous stirring, elemental fluorine (25% vol/vol in helium) is fed to the reactor and its conversion is monitored by GC analysis. When fluorine conversion drops down below 50%, hexafluoropropene (16% vol/vol in helium) is fed to the reactor by the second inlet pipe to achieve the complete conversion of all residual hydrogen atoms (during this phase, the molar ratio F2:C3F6 is about 6.5:1). Once reached the perfluorination, the residual fluorine is vented away by inert gas and the crude mixture is treated in a PFA round bottom flask with ethanol in large excess at 90° C. for 4 hours to convert all reactive perfluoroester terminal groups —$CF_2C(O)OCF_2CF_3$ and perfluorocarbonate terminal groups —$CF_2OC(O)OCF_2CF_3$ to the corresponding ethyl ester —$CF_2C(O)OCH_2CH_3$. The solution was washed with water to remove excess EtOH, HF and hydrosoluble byproducts and then the solvent is distilled away obtaining 15.7 g of an oily product whose GPC showed an average MW 950.

Example 2

Step 2 (A): Polycondensation of Cyclic Difluoroformiate and Fluorinated Diacylfluoride Following the procedure disclosed in Example 1, dry CsF powder (29.49 g, 0.19 mol.), the fluoroformate $F(O)CO—CH_2-(cC6H10)-CH_2OC(O)F$ (1) (87.14 g, 0.37 mol) (prepared from 1,4-cyclohexanedimethanol and $COF_2$) and anhydrous tetraethylene glycol dimethyl ether (130 g) were charged. Then, the perfluoromalonyl fluoride $FC(O)—CF_2—C(O)F$ (2) (55.92 g, 0.39 mol) was condensed in the autoclave. Reaction was pursued for 60 hours at 120° C. and then the crude mixture was heated for further 60 hours at 170° C.

The fluorinated phase inside the autoclave was recovered and the reaction mixture analyzed by $^1$H-NMR and $^{19}$F-NMR analyses showing the formation of the hydrofluoropolyether polymer (HFPE) having a number average MW=900 and containing functional groups —$CF_2C(O)F$ (36% mol); —$OC(O)F$ (20% mol) and neutral terminal groups —$CH_2F$ (44% mol). In a PFA 3 neck-round bottom flask (250 ml) equipped with a magnetic stirrer and water condenser the crude product was charged and treated with excess of anhydrous EtOH at 5° C. under nitrogen atmosphere. The reaction mixture was allowed to warm up to room temperature and then heated at 50° C. for 8 hours to convert all the acyl-fluoride and fluoroformate terminal groups to the corresponding ethyl ester and ethyl carbonate end groups. The obtained product was washed with water (150 cc×5 times) to remove the catalyst CsF, the solvent, HF and purified by fractional distillation to give the final hydrofluoropolyether polymer (HFPE) (95 g) that was characterized by $^1$H-NMR and $^{19}$F-NMR analyses.

Step 2—(B) Perfluorination of the Hydrofluoropolyether Polymer (HFPE) Obtained in Example 2A) to Give the Perfluoropolyether Polymers Containing Cycloaliphatic Structure.

7.5 g of the polymer obtained in step A are diluted in 248.1 g of 1,2,3,4-tetrachlorohexafluorobutane and loaded into a 250 ml stainless steel reactor equipped with a mechanical stirrer, two inlet pipes, a thermocouple and an outlet pipe; while keeping the reactor at 0° C. and under vigorous stirring, elemental fluorine (25% vol/vol in helium) is fed to the reactor and its conversion is monitored by GC analysis. When fluorine conversion drops down below 50%, hexafluoropropene (16% vol/vol in helium) is fed to the reactor by the second inlet pipe to achieve the complete conversion of all residual hydrogen atoms (during this phase, the molar ratio F2:C3F6 is about 6.5:1). Once reached the perfluorination, the residual fluorine is vented away by inert gas and the crude mixture is treated in a PFA round bottom flask with ethanol in large excess at 90° C. for 2.5 hours to convert all reactive perfluoroester terminal groups —$CF_2C(O)OCF_2CF_3$ and perfluorocarbonate terminal groups —$CF_2OC(O)OCF_2CF_3$ to the corresponding ethyl ester —$CF_2C(O)OCH_2CH_3$. The solution is washed with water to remove excess EtOH, HF and hydrosoluble byproducts and then the solvent is distilled away obtaining 10.1 g of an oily product whose GPC showed an average MW 1400.

Example 3

Following the procedure disclosed in Example 1-(A), dry CsF powder (29.49 g, 0.19 mol.), the aromatic difluoroformate $F(O)CO—CH_2—(C_6H_4)—CH_2OC(O)F$ (1) (90.4 g, 0.39 mol) (prepared from 1,4-benzen dimethanol and $COF_2$) and anhydrous tetraethylene glycol dimethyl ether (130 g) were charged. Then, the perfluoromalonyl fluoride $FC(O)—CF_2—C(O)F$ (2) (55.92 g, 0.39 mol) was condensed in the autoclave. Reaction was pursued for 60 hours at 120° C. and then the crude mixture was heated for further 60 hours at 170° C.

The fluorinated phase inside the autoclave was recovered and the reaction mixture analyzed by $^1$H-NMR and $^{19}$F-NMR analyses showing the formation of the hydrofluoropolyether polymer (HFPE) having a number average MW=1000 and containing functional groups —$CF_2C(O)F$ (35% mol); —$OC(O)F$ (22% mol) and neutral terminal groups —$CH_2F$ (43% mol). In a PFA 3 neck-round bottom flask (250 ml) equipped with a magnetic stirrer and water condenser the crude product was charged and treated with excess of anhydrous EtOH at 5° C. under nitrogen atmosphere. The reaction mixture was allowed to warm up to room temperature and then heated at 50° C. for 8 hours to convert all the acyl-fluoride and fluoroformate terminal groups to the corresponding ethyl ester and ethyl carbonate end groups. The obtained product was washed with water (150 cc×5 times) to remove the catalyst CsF, the solvent, HF and purified by fractional distillation to give the final hydrofluoropolyether polymer (HFPE) (98 g) that was characterized by $^1$H-NMR and $^{19}$F-NMR analyses.

Example 4

Step 4 (A): Polycondensation of Difluoroformiate with Cycloaromatic Group and Fluorinated Diacylfluoride Following the procedure disclosed in Example 1-step (A), dry CsF powder (21.90 g, 0.14 mol.), the aromatic difluoroformate F(O)CO—CH$_2$—(C$_6$H$_4$)—CH$_2$OC(O)F (1) (55.94 g, 0.24 mol) (prepared from 1,4-benzen dimethanol and COF$_2$) and anhydrous tetraethylene glycol dimethyl ether (200 g) were charged. Then, the perfluoromalonyl fluoride FC(O)—CF$_2$—C(O)F (2) (35.0 g, 0.24 mol) was condensed in the autoclave. Reaction mixture was heated at 110° C. by an heating mantle and kept under mechanical stirring at this temperature for 32 hours.

The fluorinated phase inside the autoclave was recovered and the reaction mixture analyzed by $^1$H-NMR and $^{19}$F-NMR analyses showing the formation of the hydrofluoropolyether polymer (HFPE) having a number average MW=1270 and containing functional groups —CF$_2$C(O)F (19% mol); —OC(O)F (11% mol) and neutral terminal groups —CH$_2$F (70% mol % mol). In a PFA 3 neck-round bottom flask (500 ml) equipped with a magnetic stirrer and water condenser the crude product was charged and treated with excess of anhydrous EtOH at 5° C. under nitrogen atmosphere. The reaction mixture was allowed to warm up to room temperature and then heated at 60° C. for 25 hours to convert all the acyl-fluoride and fluoroformate terminal groups to the corresponding ethyl ester and ethyl carbonate end groups. The obtained product was washed with water (300 cc×3 times) to remove the catalyst CsF, the solvent, HF and hydrosoluble byproducts and then the organic product treated with CH$_2$Cl$_2$ (250 cc).

The organic phase in CH$_2$Cl$_2$ was then washed with water (250 cc×3 times), dried with Na$_2$SO$_4$ and the solvent evaporated.

The obtained product was purified by fractional distillation to give the final hydrofluoropolyether polymer (HFPE) (55 g) as a viscous oil that was characterized by $^1$H and $^{19}$F-NMR analyses and with a total fluorine content of 28.7% w/w (quantified by $^{19}$F-NMR analysis with hexafluoroxylene as internal standard) and an average MW=1300 by GPC analysis.

Step 4(B-I): Partial Fluorination of the Hydrofluoropolyether Polymer (HFPE) Obtained in Example 4A) to Give Partially Fluorinated Polyether Polymers Containing Cycloaliphatic Structure.

10.0 g of the polymer obtained in Example 4-step (A) were diluted in 100.3 g of anhydrous acetonitrile and loaded into a 250 ml stainless steel reactor equipped with a mechanical stirrer, an inlet pipes, a thermocouple and an outlet pipe; while keeping the reactor at −30° C. and under vigorous stirring, elemental fluorine (1 Nl/hour, diluted 9% vol/vol in helium) was fed to the reactor for 4 hours. The crude mixture inside the reactor was recovered, diluted in a PE flask with 75 g of anhydrous acetonitrile and treated with 18 g of NaF and then left under magnetic stirring at room temperature for two days to remove the presence of HF formed. The reaction mixture was filtered under pressure over a PTFE filter (1.2·m) to remove the NaHF$_2$ salt and then the solvent was evaporated.

13.8 g of an oily product was characterized by $^1$H and $^{19}$F-NMR analyses, showing the formation of an HFPE polymer containing aromatic structure with a total fluorine content of 48.3% w/w.

Step 4(B-II): Partial Fluorination of the Hydrofluoropolyether Polymer (HFPE) Obtained in Example 4A) to Give Partially Fluorinated Polyether Polymers Containing Cycloaliphatic Structure 10.0 g of the polymer obtained in Example 4-step (A) were diluted in 101.5 g of anhydrous acetonitrile and loaded into a 250 ml stainless steel reactor equipped with a mechanical stirrer, an inlet pipes, a thermocouple and an outlet pipe; while keeping the reactor at −30° C. and under vigorous stirring, elemental fluorine (2 N/hour, diluted 9% vol/vol in helium) was fed to the reactor for 15 hours. The reaction was stopped and the residual fluorine vented away with inert gas. The crude mixture inside the reactor was recovered, diluted in a PE flask with 100 g of anhydrous acetonitrile and treated with 75 g of NaF and then left under magnetic stirring at room temperature for two days to remove the presence of HF formed. The reaction mixture was filtered under pressure over a PTFE filter (1.2 μm) to remove the NaHF$_2$ salt and then the solvent evaporated.

17.34 g of an oily product was characterized by $^1$H and $^{19}$F-NMR analyses, showing the formation of an HFPE polymer containing aromatic structure with a total fluorine content of 58.9% w/w.

Example 5

Step 5 (A): Polycondensation of Difluoroformiate with Cycloaromatic Group and Fluorinated Diacylfluoride Following the procedure disclosed in Example 1-step (A), dry CsF powder (14.80 g, 0.097 mol.), the aromatic difluoroformate F(O)CO—CH$_2$—(C$_6$H$_4$)—CH$_2$OC(O)F (1) (44.75 g, 0.19 mol) (prepared from 1,4-benzen dimethanol and COF$_2$) and anhydrous tetraethylene glycol dimethyl ether (200 g) were charged. Then, the perfluoromalonyl fluoride FC(O)—CF$_2$—C(O)F (2) (28.0 g, 0.19 mol) was condensed in the autoclave. The reaction mixture was heated at 110° C. by an heating mantle and kept under mechanical stirring at this temperature for 24 hours.

The fluorinated phase inside the autoclave was recovered and the reaction mixture analyzed by $^1$H-NMR and $^{19}$F-NMR analyses showing the formation of the hydrofluoropolyether polymer (HFPE) having a number average MW=1160 and containing functional groups —CF$_2$C(O)F (32% mol); —OC(O)F (8% mol) and neutral terminal groups —CH$_2$F (60% mol). In a PFA 3 neck-round bottom flask (500 ml) equipped with a magnetic stirrer and water condenser the crude product was charged and treated with excess of anhydrous EtOH at 5° C. under nitrogen atmosphere. The reaction mixture was allowed to warm up to room temperature and then heated at 60° C. for 30 hours to convert all the acyl-fluoride and fluoroformate terminal groups to the corresponding ethyl ester and ethyl carbonate end groups. The obtained product was washed with water (300 cc×3 times) to remove the catalyst CsF, the solvent, HF and hydrosoluble by-products and then the organic product treated with CH$_2$Cl$_2$ (200 cc).

The organic phase in CH$_2$Cl$_2$ was then washed with water (200 cc×3 times), dried with Na$_2$SO$_4$ and the solvent evaporated.

The obtained product was purified by fractional distillation to give the final hydrofluoropolyether polymer (HFPE) (45 g) as a viscous oil that was characterized by $^1$H and $^{19}$F-NMR analyses and GPC analysis showing an average MW=1200.

The invention claimed is:

1. A method for the synthesis of a mixture of polymers said polymers comprising a partially fluorinated polyether backbone possessing a plurality of recurring units including at least one cyclic group; said process comprising:

Step (I): a step of contacting:
at least one fluorinated compound comprising at least two acyl-fluoride groups; and
at least one hydrogenated compound comprising at least two fluoroformate groups of formula —$CR_H^1R_H^2$—O—C(O)F, wherein each of $R_H^1$ and $R_H^2$, equal to or different from each other at each occurrence, is independently $H$ or a C1-C6 hydrocarbon group, in the presence of at least one fluoride-containing compound, wherein:
(i) at least one compound (F) is a compound ($F_C$) of formula:

wherein:
each of Ef, equal to or different from each other, is a bond, or a divalent fluorocarbon group, possibly comprising one or more than one heteroatoms selected from Cl, N, O and S;
Rcf is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
and/or
(ii) at least one compound (H) is a compound ($H_C$) of formula:

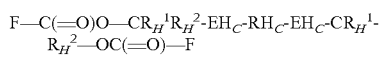

wherein:
each of $EH_C$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
$RH_C$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
each of $R_H^1$ and $R_H^2$, equal to or different from each other at each occurrence, is independently $H$ or a C1-C6 hydrocarbon group;
to provide a polymer mixture ($FH_{cyclic}$);

Step (II):
heating said polymer ($FH_{cyclic}$) obtained in Step (I) at a temperature exceeding 120° C., for a duration of at least 4 hours and in the presence of a fluoride-containing compound comprising at least one of (i) a metal fluoride of formula $MeF_y$, with Me being a metal having y valence, y being 1 or 2, selected from the group consisting of NaF, $CaF_2$, AgF, RbF, CsF, KF, and combinations thereof; and (ii) an (alkyl) ammonium fluoride of formula $NR^{HN}_4F$, with each of $R^{HN}$, equal to or different from each other being, independently, a $H$ or an alkyl group,
so effecting the thermolysis of at least a fraction of the chain ends of polymer ($FH_{cyclic}$) of formula —$CR_H^1R_H^2$—OC(=O)F to groups —$CR_H^1R_H^2$—F, to provide polymer mixture ($FH_{cyclic\_CH2F}$);

Step ($III^A$):
reacting polymer mixture ($FH_{cyclic\_CH2F}$) under esterification conditions in the presence of an alcohol of formula $R_hOH$, with $R_h$ being a $C_1$-$C_3$ hydrocarbon group; to provide for polymer mixture ($FH_{cyclic\_CH2F\text{-}ester/carbonate}$), and then Step (III):
fluorinating polymer mixture ($FH_{cyclic\_CH2F\text{-}ester/carbonate}$) to provide for corresponding fluorinated polymer mixture ($FF_{cyclic\_CF3\text{-}ester/carbonate}$).

2. The method of claim 1 wherein if compound F is not $F_C$, compound F is selected from the group consisting of:
(F-i) FC(O)—$CF_2$—C(O)F;
(F-ii) FC(O)—$CF_2$—$CF_2$—C(O)F;
(F-iii) FC(O)—$CF_2$—$CF_2$—$CF_2$—C(O)F;
(F-iv) FC(O)—$CF_2$—$CF_2$—$CF_2$—$CF_2$—C(O)F; and
(F-v) FC(O)—$CF_2$—O—$CF_2$—C(O)F.

3. The method of claim 1, wherein at least one compound (H) is a compound ($H_C$), and said compound ($H_C$) is reacted with one or more than one of the following:
(F-i) FC(O)—$CF_2$—C(O)F;
(F-ii) FC(O)—$CF_2$—$CF_2$—C(O)F;
(F-iii) FC(O)—$CF_2$—$CF_2$—$CF_2$—C(O)F;
(F-iv) FC(O)—$CF_2$—$CF_2$—$CF_2$—$CF_2$—C(O)F; and
(F-v) FC(O)—$CF_2$—O—$CF_2$—C(O)F.

4. The method of claim 1, wherein compound ($H_C$) is an alicyclic compound of formula:

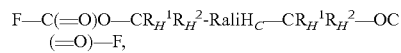

wherein $R_H^1$ and $R_H^2$ have the meaning described above, and $RaliH_C$ is a divalent C5-C18 cycloaliphatic group, which is selected from the group consisting of:
divalent cyclobutylene groups;
divalent cyclopentylene groups;
divalent cyclohexylene groups;
divalent norbornylene groups;
divalent bicyclo[4.4.0]decyl groups;
divalent spiro[5,4]decyl groups; and
divalent spiro[5,5]undecyl groups; or an aromatic compound of formula:

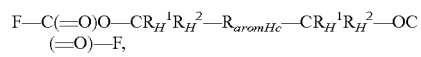

wherein $R_H^1$ and $R_H^2$ have the meaning described above, and RamHc is a divalent $C_5$-$C_{18}$ cycloaromatic group, which may be selected from groups including one or more than one:
divalent benzylene groups;
divalent naphthylene groups;
divalent furylene groups;
divalent pyridylene groups;
divalent pyrrolylene groups;
divalent thiophenylene groups;
divalent aromatic groups of formula —$Ar_1$—[$W_{Ar}$—$Ar_2$]$_{nar}$—, wherein each of Ar1 and Ar2 are divalent aromatic groups, $W_{Ar}$ is a bond or is a group of any of formula —O—, —$C(CH_3)_2$—, —$SO_2$—; —C(O)—; and nar is zero or an integer of 1 to 3.

5. The method of claim 4, wherein compound ($H_C$) is selected from the group consisting of:
1,2-cyclobutanediol difluoroformate;
1,3-cyclobutanediol difluoroformate;
2,2,4,4-tetramethyl-1,3-cyclobutanediol difluoroformate;
1,1-cyclobutanedimethanol difluoroformate;

cis- and trans-1,2-cyclohexanediol difluoroformate;
1,4-cyclohexanediol difluoroformate;
cis- and trans-1,3-cyclohexanediol difluoroformate;
1,4-cyclohexanedimethanol difluoroformate;
4-methyl-1,2-cyclohexanedimethanol difluoroformate.

6. The method of claim 1, wherein substantially all hydrogen atoms of moieties $—CR_H^1R_H^2-E_{Hc}-R_{Hc}-E_{Hc}-CR_H^1R_H^2—$, and $-E_f-R_{cf}-E_f-$ are replaced in Step (III) with fluorine atoms, so that said moieties are transformed into groups of formula $—C_F^1R_F^2-E_{FC}-R_{FC}-E_{FC}-CR_F^1R_F^2—$, and $-E_{fF}-R_{cfF}-E_{fF}-$ wherein:

each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;

$R_{FC}$ is divalent perfluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S; and each of $R_F^1$ and $R_F^2$, equal to or different from each other, is independently F or a $C_1$-$C_6$ perfluorocarbon group;

$R_{cfF}$ is a divalent perfluorocarbon cyclic group, which may be a perfluorocycloaliphatic, which may comprise one or more than one cyclic moiety, and which may comprise one or more than one oxygen atom included in the cycle;

each of $E_{fF}$, equal to or different from each other, is a bond, or a divalent perfluorocarbon group, possibly comprising one or more than one heteroatoms selected from Cl, and O.

7. The method of claim 1, wherein any of polymer mixtures $(FH_{cyclic})$, $(FH_{cyclic\_CH2F})$, $(FH_{cyclic\_CH2F-ester-carbonate})$, and $(FF_{cyclic\_CF3-ester-carbonate})$ is further modified using:

(i) reactivity of —C(O)F and/or (ii) reactivity of —O—C(O)—F groups, to create different chain ends and/or is submitted to a variety of additional separation steps, so as to isolate specific components thereof.

* * * * *